United States Patent [19]
Dopkin et al.

[11] 3,836,215
[45] Sept. 17, 1974

[54] SHAFT VIBRATION DAMPENING MEANS AND METHOD

[75] Inventors: Joseph A. Dopkin, Hopewell, N.J.; Paul Hermann, Easton, Pa.

[73] Assignee: Ingersoll-Rand Company, Woodcliff Lake, N.J.

[22] Filed: Feb. 15, 1973

[21] Appl. No.: 332,618

[52] U.S. Cl. .............................................. 308/184
[51] Int. Cl. ............................................ F16c 27/00
[58] Field of Search ................... 308/9, 184, 75, 22

[56] References Cited
UNITED STATES PATENTS

| | | | |
|---|---|---|---|
| 2,114,670 | 4/1938 | Searles | 308/184 |
| 3,058,785 | 10/1962 | Steele | 308/9 |
| 3,649,388 | 3/1972 | Kerr | 308/9 |
| 3,687,506 | 8/1972 | Dee | 308/9 |
| 3,756,672 | 9/1973 | Hibner et al. | 308/9 |

FOREIGN PATENTS OR APPLICATIONS 951,733            Great Britain ...................... 308/184

*Primary Examiner*—Charles J. Myhre
*Assistant Examiner*—Frank Susko
*Attorney, Agent, or Firm*—Bernard J. Murphy

[57] ABSTRACT

The method comprises the mounting of an annular element directly about a shaft, and in engagement with a shaft supporting structure, and forming a lubricant-filled reservoir between the shaft and structure surfaces. Means, according to one embodiment of the invention for practicing the novel method, comprises a roller bearing, having reservoir-forming walls carried on the outer race thereof, for direct mounting of the inner race on the shaft.

2 Claims, 4 Drawing Figures

PATENTED SEP 17 1974 3,836,215

SHAFT VIBRATION DAMPENING MEANS AND METHOD

This invention pertains to shaft vibration dampening means and methods, and in particular to such means and methods which comprise squeeze-film dampening. Squeeze-film dampening is known from the prior art, however, the known devices, and methods of their use have particular, inherent limitations. Typically, these dampeners are mounted about bearings which support the shaft to be dampened and, accordingly, can not suppress vibration efficiently. The bearing necessarily has a built-in tolerance or clearance which must be added to the "dampening-movement tolerance" of the vibration-dampening device, so that it becomes difficult to establish a fixed limit of vibrational migration for the shaft. So also, such dampeners necessarily are large, in that they must envelop the bearing which encloses the shaft. More importantly, however, in that the known dampeners are mounted about the shaft-supporting-bearings, typically the dampeners are constantly bottomed out by weight or gear loading.

It is an object of this invention to teach a vibration dampening means and method which avoids the difficulties already known with such devices in the prior art. It is particularly an object of this invention to teach a method of dampening vibration in a shaft supported by a mounting structure, comprising the steps of mounting an annular element, having inner and outer surfaces, directly about an outer surface of the shaft, in engagement with a surface of the structure; forming a lubricant reservoir between one of said inner and outer surfaces of said element and one of said shaft and structure surfaces; and filling said reservoir with lubricant.

Another object is to teach means for dampening vibration in a shaft supported by a mounting structure, comprising an annular element, for mounting thereof directly about an outer surface of said shaft; said element having inner and outer surfaces; and at least one pair of parallel and spaced-apart annular recesses, formed in one of said inner and outer surfaces of said element, for receiving wall members therewithin toward defining a lubricant reservoir between said wall members.

A feature of this invention comprises the mounting of an annular element directly about a shaft, and in engagement with a shaft supporting structure, and forming a lubricant-filled reservoir between the shaft and structure surfaces. Means, according to one embodiment of the invention for practicing the novel method, comprises a roller bearing having reservoir-forming walls carried on the outer race thereof, for direct mounting of the inner race on the shaft. Further objects and features of this invention will become more apparent by reference to the following description taken in conjunction with the accompanying figures in which:

Figure 1:
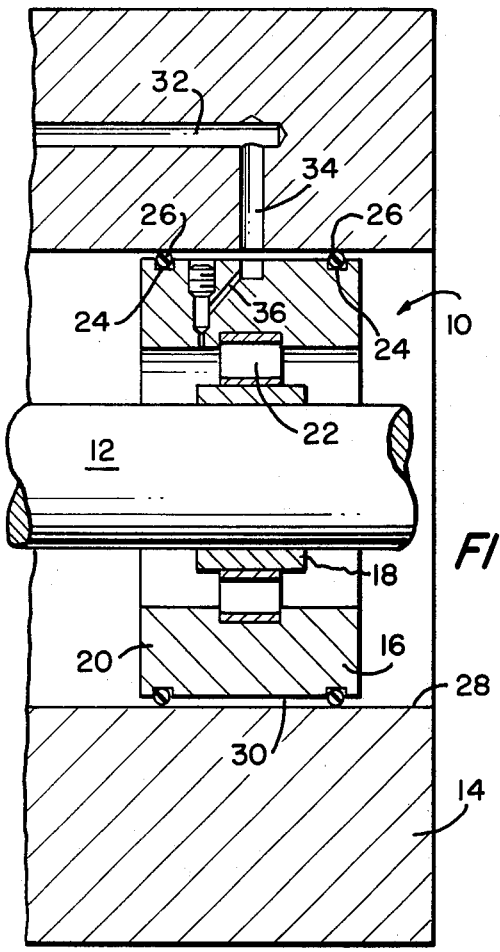
FIG. 1 is a vertical cross-sectional view of an embodiment of the invention disposed about a shaft within a shaft supporting structure.

As shown in FIG. 1 the novel shaft dampening means 10 is disposed about a shaft 12 within a shaft support 14. The means 10 comprises a bearing 16 having a inner race 18 and outer race 20 with roller elements 22 fixed therebetween. A pair of annular spaced-apart and parallel recesses 24 are formed in the outer race 20 of bearing 16, and the recesses receive a pair of wall members 26 which, in this embodiment, are resilient O-rings. O-rings 26 project slightly from the surface of race 20, and cooperate with a surface 28 of support 14 to define a reservoir 30 therebetween. Passageways 32 and 34 formed within support 14 conduct lubricant to the reservoir 30 and therefrom through a diagonal "bleed" conduit 36. The lubricant supplied to the reservoir 30 serves as the "squeeze-film" media for dampening vibration of shaft 12. The conduit 36 allows a flow of lubricant to remove heat, and also allows a minor flow of the lubricant to be supplied to the roller elements 22 and the inner race 18.

Figure 2A:
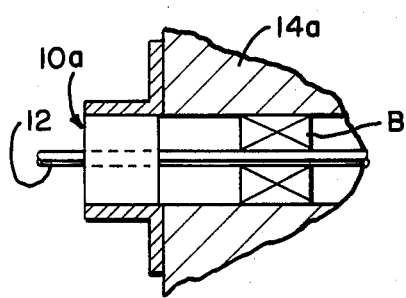
FIG. 2A is a schematic depiction of the FIG. 2 shaft support arrangment.
Figure 2:
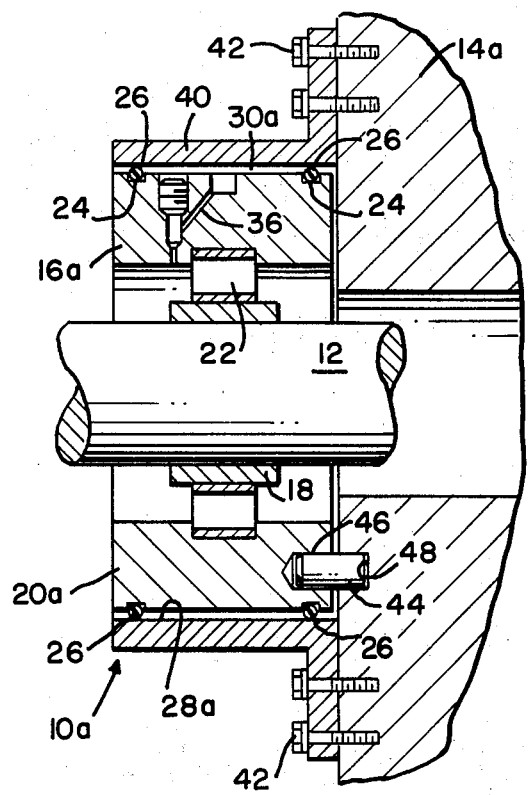
FIG. 2 is a alternate embodiment of the invention in which the novel device is supported within a cylindrical carrier mounted to the shaft supporting structure.

The embodiment shown in FIG. 2 is similar to that shown in FIG. 1, where similar or same index numbers designate similar or same elements.

In the embodiment of FIG. 2, the bearing 16a is carried on shaft 12 like that of the embodiment of FIG. 1. However the means 10a is supported within a flanged cylinder or carrier 40 which, in turn, is secured by means of hardware 42 to the shaft support 14a. A keying pin 44 is set within recesses 46 and 48, which are formed, respectively in the outer race of the bearing and in the shaft support 14a, to receive the pin 44 to key the bearing to the structure 14a. Similar keying means (not shown) set means 10 (FIG. 1) in support 14, and means equivalent to passageways 32 and 32 supply lubricant to means 10a (FIG. 2) but these are not shown.

Figure 1A:
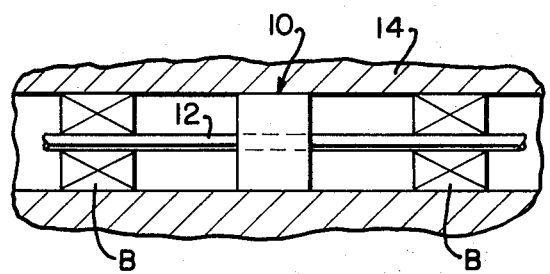
FIG. 1A is a schematic depiction of the FIG. 1 shaft support arrangement.

In both embodiments, according to the method taught by this disclosure, the vibration dampening means 10, 10a are directly carried on the shaft 12 to reduce vibration. Particularly important, according to the invention, the vibration dampening means do not comprise shaft supporting means. Elsewhere along the shaft 12 are bearings "B" (FIGS. 1A, 2A) for supporting the shaft within the support 14 or 14a. Therefore the novel means are not required to carry shaft or gear weight, and gear loading, thus, the inventive means will not bottom out.

According to this teaching, as the novel means 10 or 10a neither do, nor are intended to, support weight and loading, they can be made small (and, thus, inexpensively). It is only necessary to form or fix a small-diameter stub shaft at a terminal end of a shaft (within or adjacent to a shaft-support structure), and fit an embodiment of the improved dampening means thereon.

The embodiments shown teach the use of bearings having recesses 24 formed in the outer races thereof to receive O-rings 26 to form a squeeze-film reservoir 30 (30a). But it must be understood that bearings 16 and 16a are not load-carrying bearings. Bearings are used to define the means 10 and 10a, so that rotating shafts can be accommodated without rotating (and centrifuging the reservoirs). More, they render manufacture of the novel means exceedingly simple and inexpensive. Yet, the teachings herein are applicable to fixed shafts, which carry rotatable members, equally well. Such shafts can employ the means 10 or 10a, to suppress standing-wave "whipping" or vibration, caused by the rotating member. More, very simply, such shafts can use a single-element means—roughly corresponding to outer race 20 (or 20a), where the single element, the annulus, has an inside diameter corresponding to that of the shaft. So also, the reservoir 30 (or 30a) can be formed on the i.d. or the o.d. of the annulus.

While the invention has been described in connection with specific embodiments thereof, it is to be clearly understood that this is done only by way of example and not as a limitation to the scope of the invention, as set forth in the objects thereof, and in the appended claims.

We claim:

1. A bearing, for use with a shaft to damp vibrations thereof, comprising:

inner and outer races concentrically disposed about a rotary axis;

roller elements confined between said races; wherein one of said races has a straight, cylindrical surface which is concentric with said axis; and said surface has at least one pair of parallel and spaced-apart annular recesses formed therein for receiving wall members therewithin; and resilient, annular wall members nested in said recesses, an annular portion of each of said wall members projecting from said straight, cylindrical surface fully about the circumference thereof;

said wall members, together with a portion of only said straight, cylindrical surface, defining a squeeze-film damper lubricant reservoir between said wall members; and wherein said one race has a lubricant conduit formed therein and therethrough for conducting lubricant from said reservoir to said roller elements and to the other of said races.

2. A bearing, according to claim 1, wherein:

said recesses are formed in said outer race in an outer suface thereof.

* * * * *